(No Model.) 2 Sheets—Sheet 1.
G. JOBSON.
VEHICLE WHEEL.
No. 536,528. Patented Mar. 26, 1895.
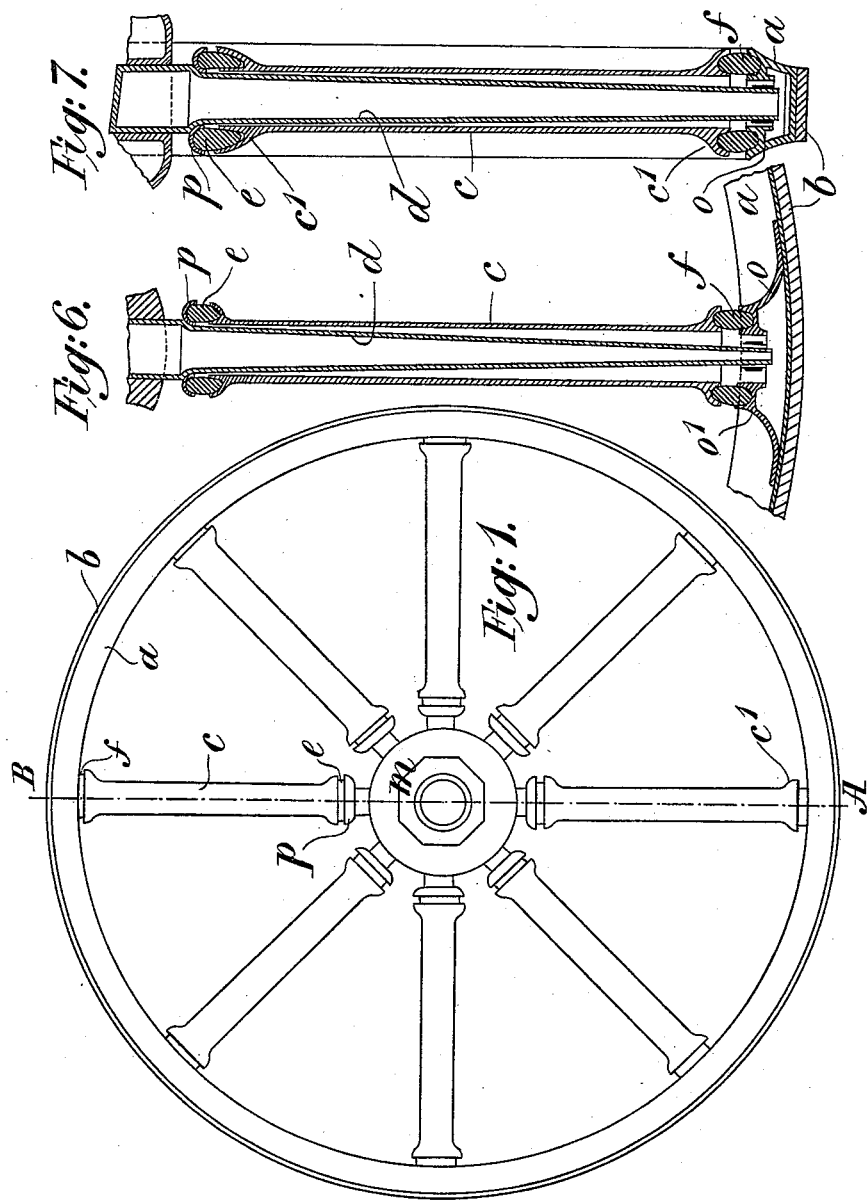
Witnesses.
Thos. A. Green
Robert Emmett
Inventor.
Godfrey Jobson.
By James L. Norris
Atty.

(No Model.) 2 Sheets—Sheet 2.
G. JOBSON.
VEHICLE WHEEL.
No. 536,528. Patented Mar. 26, 1895.
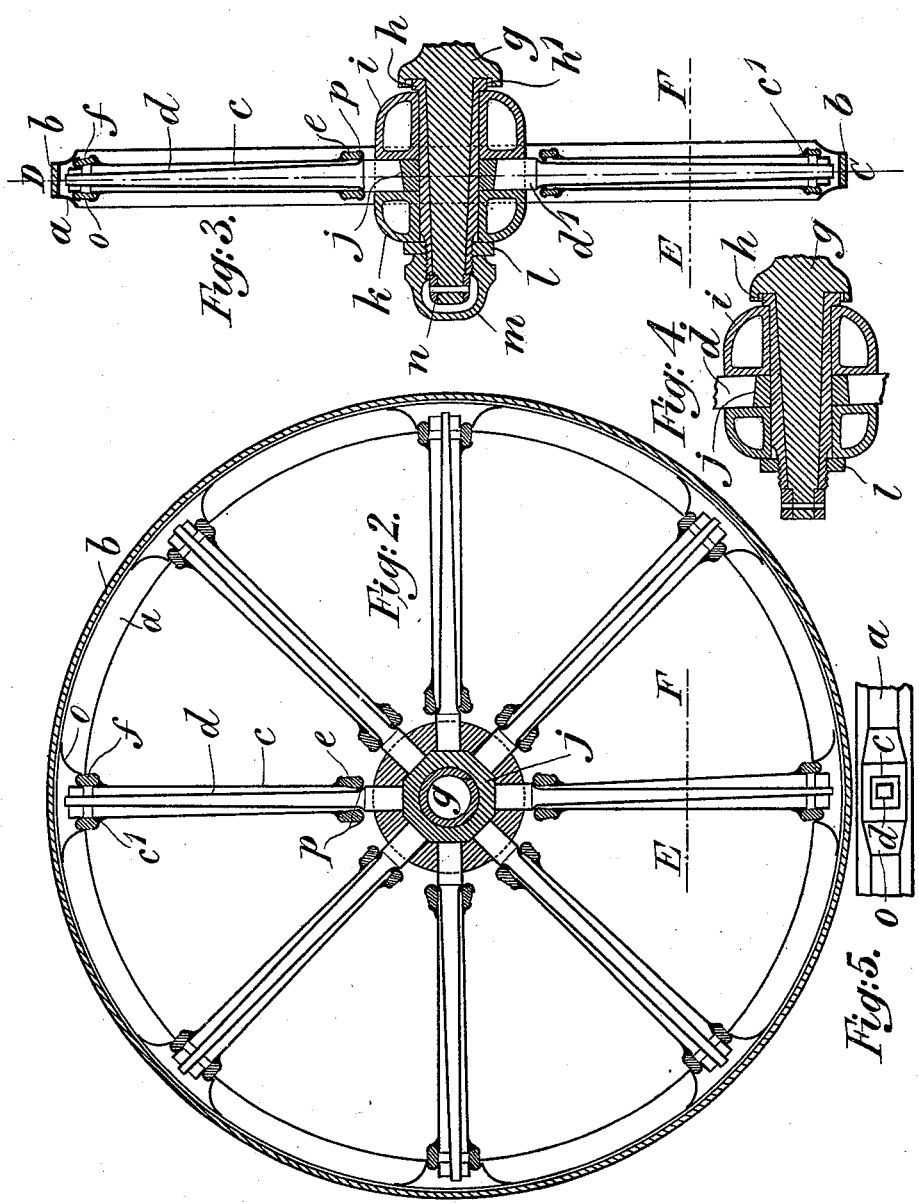
Witnesses.
Thos. A. Guen
Robert Evartt
Inventor.
Godfrey Jobson.
By James L. Norris.
Atty.

UNITED STATES PATENT OFFICE.

GODFREY JOBSON, OF LONDON, ENGLAND.

VEHICLE-WHEEL.

SPECIFICATION forming part of Letters Patent No. 536,528, dated March 26, 1895.

Application filed October 30, 1894. Serial No. 527,457. (No model.)

*To all whom it may concern:*

Be it known that I, GODFREY JOBSON, iron-founder, a subject of the Queen of Great Britain, residing at Grange Court, Ealing, London, in the county of Middlesex, England, have invented certain new and useful Improvements in Wheels for Common Road-Vehicles, of which the following is a specification.

The object of the invention is to so construct wheels of common road vehicles as to prevent the conveyance of the effects of concussion from the parts of the wheel in contact with the road to the other parts of the wheel and vehicle, and to prolong the effective life of the wheel by obviating destructive strains.

In carrying out my invention I employ an axis which may be of substantially usual construction—having flanged collars, coned ends, pinned collars and pins. Upon this coned end (referring to one end of such an axle) is mounted a correspondingly bored steel bush, having inwardly of its external diameter an annular flange, next a larger diameter and two lesser diameters, each extending one beyond the other toward the outer face of the wheel. On the larger diameter is mounted a cast iron, or other suitable annular part shaped somewhat like a crown wheel the spaces between the teeth, so to speak, each forming three sides of a socket for a spoke which may be of tubular metal. On the next adjoining diameter is mounted or tapered cone annular part; upon which tapered ends of the spokes butt and are pressed outward in the tightening up of the parts. On the next diameter is mounted a loose collar which when clamped up against the open sides of the spoke sockets closes the spokes thereinto and forces their ends up the inclined faces of tapered cone annulus. Against this loose collar presses a collar or circular plate formed with a screw thread which engages a thread formed on this outward and smallest diameter of the steel bushing, and behind this again is screwed up the cap of the wheel. Each spoke at its outer end is formed with a cupped or recessed end, which end receives an india rubber or equivalent elastic pad and each such pad rests in another cupped or recessed part formed on or in the rim of the wheel and on this rim may be mounted a metallic or other tire. Within or more or less adjacent to the hub of the wheel each spoke is formed with a pair of cupped or recessed parts interposed between which is another india rubber, pneumatic or equivalent elastic pad. Thereby an intermediate part or knuckle ended joint is formed between the hub end and the rim end of each spoke.

The spokes are formed hollow, and fixed securely in the hub section of each of the spokes is the butt end of a tapered stiffener rod or internal spoke which passes down through the hollow intermediate part spoke into the rim portion so as to control the lateral flexure of the spokes, but allowing a limited play in that direction as well as a radial play of the part spokes as the rubber pads are compressed between hub and rim. To avoid concussive contact between the taper end of the stiffener and the rim recess in which that end lies either may be covered or lined, as with leather.

In the drawings Figure 1 is an external side view of my improved wheel. Fig. 2 is a sectional view of same taken on line C. D Fig. 3, but with axle removed. Fig. 3 is a section of same taken on the line A. B. Fig. 1. Fig. 4 shows the hub of wheel separately with the expander cone pressed into place expanding the spokes. Fig. 5 is a sectional plan taken on the line E, F, Fig. 2, showing the internal and external spokes, the cup of outer end of spoke in plan and a portion of the rim in plan. Fig. 6 is an enlarged view in section of a spoke and part of the rim as Fig. 2. Fig. 7 is an enlarged view in section of a spoke and a part of the rim $a$.

$a$ is the rim which may be of steel or other suitable material. $b$ is an ordinary tire mounted thereon.

$c$ is the external spoke with its cups $c'$, $c'$, one at each end for receiving the rubber buffers $e$ and $f$.

$d$ is the internal spoke one end $d'$ of which is held fast in the hub and toward that end is a cup for receiving the rubber buffer. The other end is free and is surrounded by a band of leather or other suitable material.

$e$ and $f$ are rubber buffers.

$g$ is the axle arm which may be tapered as shown or parallel or partly both with its collar $n$ held on by a pin.

$h$ is the axle box, of steel or other suitable material, which may be of tapered, or other form, corresponding to the form of axle arm internally; and externally may be of two or more different diameters. This axle box has a solid collar or head $h'$ to it. Next to this head is mounted on the external diameter of axle box a cast iron or other suitable annular part shaped somewhat like a crown wheel $i$. Next to this comes the expander cone $j$ which has as many sides as there are spokes. The taper ends of the spokes $d$ butt against the cone and are pressed outward in the tightening up of the parts.

$k$ is a loose collar for clamping the spokes into their sockets.

$l$ is an ordinary nut and $m$ is the oil cap which when screwed against the nut $l$ forms a lock nut to prevent the parts becoming loose.

$o$ is a support forming a base for the cup $o'$ for the outer face of the rubber $f$. It is brazed or otherwise fastened into the rim $a$ and also forms thereby a stay, or connection between the two sides of the rim to stiffen it. It has also a rectangular space in its center which allows the inner spoke $d$ free play vertically through there being more or less play allowed in the vertical plane of the wheel, but it is confined laterally much more closely so as to prevent the rim of wheel being displaced by undue side strains.

I do not confine myself to the employment of two rubber pads to each spoke as such number with their corresponding cup recesses may be varied. By these means an easy motion is secured to the inward parts of the wheel and to the vehicle, a certain but well controlled amount of elastic play is allowed to the spoke parts relatively to the rim or felly parts of the wheel and wrenching strains on the hub are avoided.

In constructing wheels according to my invention I do not confine myself to the form of axle construction or to the parts adjacent thereto.

Having now particularly described and ascertained the nature of my said invention and in what manner the same is to be performed, I declare that what I claim is—

1. In a vehicle wheel, the combination with the hub and the rim, of the internal spokes $d$, the external spokes $c$ inclosing the said internal spokes and having cups $c'$ at their ends, and the rubber buffers $e\,f$ inserted in said cups, substantially as described.

2. In a vehicle wheel, the combination with the rim and the elastically jointed internal and external spokes inclosed one within the other, of the axle box having thereon the expander cone $j$ provided with as many sides as there are spokes, the collars $i$ and $k$, nut $l$ and cap $m$, substantially as described.

In testimony whereof I, the said GODFREY JOBSON, have hereunto set my hand this 15th day of October, 1894.

GODFREY JOBSON.

Witnesses:
WILMER MATTHEWS HARRIS,
W. J. NORWOOD.